Oct. 11, 1949.  C. P. PEPPER  2,484,185

TORQUE RELEASE CLUTCH

Filed Feb. 18, 1948

INVENTOR.
CARL P. PEPPER
BY George M. Soule
ATTORNEY

Patented Oct. 11, 1949

2,484,185

UNITED STATES PATENT OFFICE 2,484,185

TORQUE RELEASE CLUTCH

Carl P. Pepper, Plainfield, Ind., assignor to L. G. S. Spring Clutch Corporation, Indianapolis, Ind., a corporation of Indiana Application February 18, 1948, Serial No. 9,082

7 Claims. (Cl. 192—56)

1

The invention relates to an improved overload torque release clutch mechanism or, in other words, a mechanism capable of transmitting torque from one member to another up to a certain value and then becoming inoperative or substantially so but subject to reestablishment of normal operation either automatically or at the will of an attendant. The above indicates the general object.

Another object is to provide an overload torque release clutch mechanism employing a helical clutch spring and coacting drum wherein the spring is maintained in an energizing or clutching condition on the drum so long as the torque to be transmitted does not exceed a selected value, the mechanism becoming automatically operative upon imposition and maintenance of overload to effect and maintain periodic or cyclic disengagement of the spring and drum and again becoming fully operative when and if the overload is dissipated.

A further specific object is to provide an overload torque release device of the spring clutch type in which the spring and its coacting drum are maintained in clutching contact until the torque reaches or exceeds a certain value and then is automatically released and remains released until a manual or other operation has been performed to reestablish the clutch connection.

Other objects and features of the invention will be explained below in connection with the preferred illustrated forms given by way of example of practical embodiments.

Figure 1:
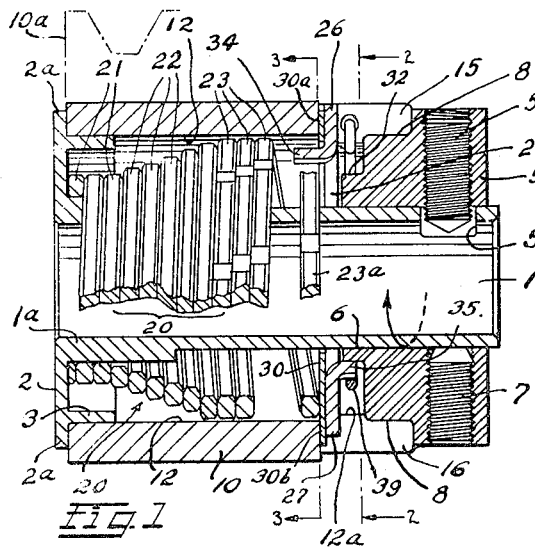
Figure 2:
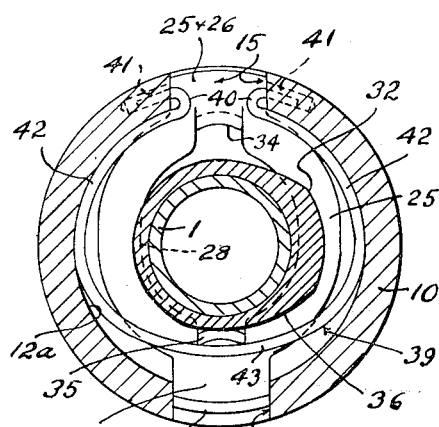
Figure 3:
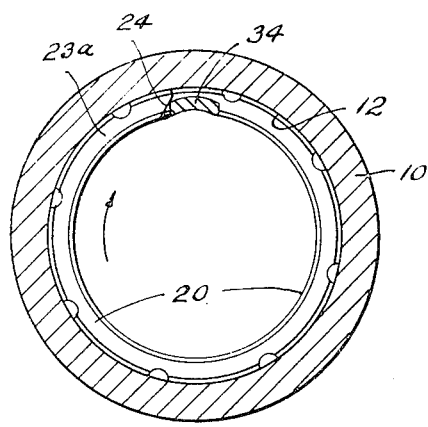
Figure 4:
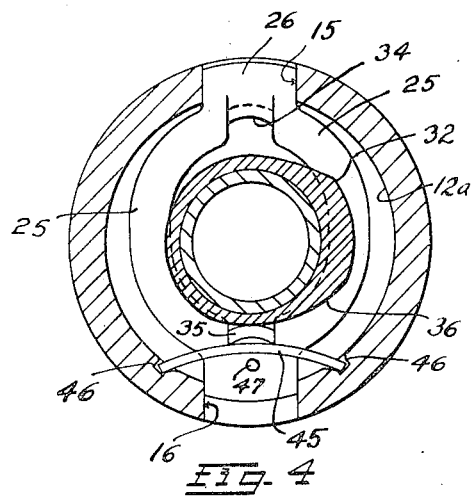
Figure 5:
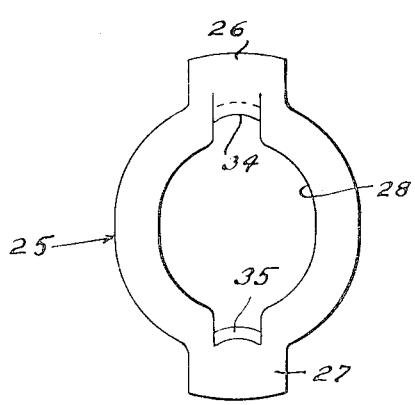

In the drawing, Fig. 1 is a central longitudinal sectional view of the clutch unit, the clutch spring being shown partly in elevation; Figs. 2 and 3 are transverse cross sectional views as conventionally indicated on Fig. 1; Fig. 4 is a view similar to Fig. 2 showing a modified clutch-actuator-biasing spring; and Fig. 5 is an elevational view of an actuator plate or yoke forming part of the unit.

The device as shown in Figs. 1 to 3 and 5 comprises a torque-transmitting member 1 in the form of a tubular shaft having an enlarged flange portion 2 at one end with an inwardly turned, drum-like rib 3 thereon. The portion 2a of the flange 2 forms, in cooperation with the rib, one of a pair of axially spaced journal supports for another torque-transmitting member in the form of a sleeve or drum 10. At the opposite end of the tubular shaft 1 the same carries a collar 5 centrally bored at 6 to fit the shaft. The collar 5 is adapted to be secured onto the tubular shaft in various turned positions of the collar (for reasons given later herein) as by a set screw 7 engaging the wall of the shaft. The collar 5 has a reduced diameter circular surface portion 8 which cooperates with the journal-forming parts 2a and 3 to form the other of said pair of journal supports for the rotary sleeve or drum member 10. The member 10 has an internal smooth peripheral clutch surface 12 a portion of said surface bearing on the flange portion 3 of the member 1. An extension of the surface 12 to the right as at 12a bears on the reduced diameter journal surface 8 of the member 5. Thus the unit assembly comprising parts 1 and 5 forms one of two coaxial rotary members to be connected by the clutch and the sleeve or drum 10 the other of such two members. The member 10 may carry a driving pulley as suggested at 10a. Either member, 1 or 10, may be the driving and either member the driven element of the clutch. The sleeve 10, beyond the right hand limits of the drum surface 12, is diametrically and axially slotted as at 15 and 16 to form a guide and support for an overload clutch release actuating mechanism to be described later.

Cooperating with the clutch drum surface 12 is a friction clutch member 20 shown in the form of a helically coiled spring having smaller diameter non-clutching coils 21 secured as by brazing or the like to a thickened portion 1a of the hollow shaft 1. The left end of the clutch spring may abut a driving pin or shoulder on hollow shaft 1, and/or may be in interference fitting relation to said shaft. Beyond the smaller diameter coils are normally non-clutching but torsionally yielding coils 22; and beyond those coils are a series of clutching coils 23, the last one of which, 23a, is openly wound and terminates in a beveled face or shoulder 24 as shown in Fig. 3.

The clutching coils 23, in normal unstrained condition, are slightly out of contact with the drum 12; and when the shaft 1 is rotated in the direction indicated by the arrow on Fig. 1 or clockwise in Figs. 2 and 3, the clutch spring may be energized into clutching contact with the drum by maintenance of a tangential force opposing the free clockwise movement of the spring in the drum as by abutment with the beveled face 24 of the end coil.

For the purpose of maintaining energizing pressure on the clutch spring end 24, an actuator or spring energizer yoke in the form of a plate 25 carrying an energizing projection or lip 34 (Fig. 3) is slidably supported principally by the walls defining the slots 15 and 16. The form of the actuator or spring energizer yoke or plate is most clearly shown by comparison of Figs. 1 and 5. The plate 25 has relatively opposite parallel sided end portions 26 and 27 (see Fig. 5) for sliding engagement respectively with the slots 15 and 16. The actuator plate has a generally elliptical hollow body portion extending loosely around the hollow shaft 1, there being a sufficiently elongated circular opening 28 in the plate to allow a considerable movement thereof transverse to the axis of the clutch or vertically in the position of the parts shown. The actuator plate 25 bears on one side against a flat annular supporting piece 30 approximately fitting the circular surface 12a and extended into the slots 15 and 16 short distances as at 30a and 30b. The plate 30 acts also as an axial retainer for the right hand free end coil 23a of the clutch spring. The actuator plate is additionally retained against excessive movement axially of the clutch by a further reduced diameter generally circular portion 32 of the collar 5, which portion 32 is somewhat larger in diameter than the elongated opening 28 of the actuator plate for axial retaining abutment with said plate.

To form the energizing abutment or lip 34 a portion of the extension 26 of the actuator plate is lanced out and turned toward the clutch spring. Fig. 3 shows the normal or operating position of the lip 34 in relation to the clutch spring end surface 24. On the opposite side of the plate 25, and at its opposite end, is a similarly formed cam-follower projection or lip 35 lying adjacent the reduced diameter portion 32 of the collar 5. The cam-follower 35 as shown particularly by Fig. 2 normally bears against an acuate cam surface 36 formed on said reduced diameter portion 32, being biased toward the cam surface by a generally C-shaped spring 39. The spring 39, whose form is best shown by Fig. 2, is a metal wire with supporting hook portions 40 seated in tangential bores 41 in the walls of the slot 15; adjacent arm portions 42 lying against the circular surface 12a for support, and a connecting free flexing portion 43 underlying and always bearing radially inwardly toward the clutch axis on the cam-follower 35.

The hollow shaft 1 may be fastened to a driving part telescoped thereby (not shown) by means of a set screw 50 on the collar member 5 and extending through a circumferentially elongated slot 51 in the wall of the hollow shaft 1 for contact with such driving part. The slot 51 enables some angular adjustment of the collar 5 on the shaft 1 without having to release the screw 50.

To adjust the overload release point of the clutch, starting with the parts in the relative position illustrated, the drum 10 may be secured against rotation in any suitable manner, the collar 5 released from the hollow shaft 1 as by loosening the screw 7, and then the shaft 1 may be turned clockwise as viewed in Fig. 2 a few degrees (the necessary extent being permitted by the slot 51) causing expansion of the clutching coils by abutment of the end coil with the lip 34; subsequent rotation increases torsional deflection in the coils 22 until the desired maximum torque to be transmitted by these coils 22, as indicated for example, by a torque wrench connected with the shaft 1, is obtained. The member 5, including cam surface 32, is then rotated to its release point, after which the screw 7 is reseated against the hollow shaft.

Operation

With the above described arrangement and relative position of parts, it will be evident that if the shaft 1 is the driving member and the sleeve 10 the driven member exerting some resisting torque, rotation of the shaft 1 in the indicated direction will cause the clutch spring to be expanded by the projection 34 of the actuator plate 25 into contact with the drum surface 12 so that the drum will be driven at the same speed as the shaft 1. As the clutch is loaded angular movement occurs between drum 10 and hollow shaft 1 due to straining of the torsionally flexible coils 22. A predetermined angular lagging of the drum or overtravel of the shaft 1 will result in a relative angular movement between the cam 36 of the collar member 5 and the cam-follower lip 35, so that the energizer projection 34 of the actuator plate will be forced inwardly toward the clutch axis (downwardly as shown), thus fully releasing the clutch spring coils 23 from the drum surface 12. Thereupon the drum surface 12 of the sleeve 10 is completely released by the clutch spring and the free spring end 24 moves to the right over the radially lowered energizer lip 34. During the subsequent nearly full turn rotary movement of the cam 36 approximately to its original (illustrated) position the actuator plate will be returned by the spring 39 soon enough to present the energizer lip into the path of movement of the clutch spring end 24 and cause re-engagement of the clutch. If the overload torque has not been dissipated during such free single rotation of the drive shaft or, in other words, if the load on the sleeve 10 has not been diminished to or below that required to produce sufficient angular movement for the cam 36 to cause release of the clutch spring, the same cyclic engagement and release or tripping operation will be repeated on each rotation of the shaft 1 and its cam 33 so long as the overload condition persists.

The initial tripping movement of the actuator plate 25 out of its spring energizing position shown by Figs. 1 and 3 may be used to effect a signal of any sort or a shut-down operation of the mechanism served by the clutch if desired. The repeated energization and de-energization of the clutch during overload is of advantage by way of tending to overcome the overload by a jogging action which, however, even if continued indefinitely does not ordinarily develop sufficient torque strains in the clutch or the mechanism served thereby to damage either.

Modified form

If it is desired to arrange the clutch for complete release upon occurrence of any overload sufficient to cause the coils 22 to be flexed to the releasing point, then an overcenter or toggling action type of spring such as shown at 45 Fig. 4 may be used in place of the spring 39 of Fig. 2. The overcenter spring 45 is an arched piece of spring metal having its ends projecting loosely into supporting cavities 46 intersecting the surface 12a so that the intermediate bowed portion of the spring normally holds the actuator plate 25 in position to energize the spring. When overload occurs the described operation of the mechanism to effect a clutch spring deenergizing operation of the plate 25 occurs as before, and the spring 45 is so designed as to buckle into an overcenter, oppositely bowed, position so that it will not, until re-set manually, bias the actuator plate into clutch-spring-energizing position. In such case the clutch mechanism remains wholly inoperative during further rotation of the shaft 1;

and such rotation may be discontinued as by a switch operated by the actuator plate and controlling the driving motor. When the cause of the overload has been removed the actuator plate is returned manually to its normal operating position causing the spring 45 to be returned to its position illustrated by Fig. 4. Movement of the plate 25 may restore the spring 45 through the intermediary of an abutment pin 47 on the plate.

I claim:

1. An overload release clutch comprising a rotary drum member, a coaxial torque-transmitting member, a friction clutch element having a torque-transmitting torsionally yieldable portion connected with the coaxial member and a radially yieldable clutching portion for engagement with the drum but normally disengaged therefrom, a clutch actuator carried by the drum member, normally biased for movement into clutch actuating position relative to the radially yieldable portion of the clutch element and movable to an idle position, and torque releasing means co-rotatively carried by the coaxial member and rendered operable consequent upon angular movement of the coaxial member relative to said clutching portion and the drum, enabled by movement of said torsionally yieldable portion of the clutch element under overload, to move the actuator to its idle position.

2. The clutch according to claim 1 wherein the actuator has a shoulder normally holding the radially yieldable portion of said clutch element in clutch energizing position, and the torque releasing means is a cam on said coaxial member movable into a shoulder-displacing, clutch-releasing position relative to the actuator once for each 360° relative rotation between the drum and coaxial member.

3. An overload release clutch comprising a rotary drum member, a coaxial torque-transmitting member, a helical clutch spring yieldingly connected at one end to the coaxial member for rotation of that end of the spring therewith and a radially yieldable clutching coil portion for engagement with the drum but normally disengaged therefrom, a clutch actuator carried by the drum member, continually biased for movement into clutch actuating position relative to a coil of the radially yieldable portion of the spring and movable to an idle position, and torque releasing means mounted to turn with the coaxial member and rendered operable consequent upon angular overtravel of the coaxial member relative to said clutching coil portion and the drum surface engaged thereby to move the actuator to its idle position.

4. The clutch according to claim 3 wherein the clutch actuator has a shoulder normally positioned in the path of movement of a terminal coil of the clutch spring to energize the spring, and the coaxial rotary member is angularly adjustable relative to the torque releasing means so that, with the shoulder and terminal coil in clutch energizing relationship, the overload release point of the clutch may be changed.

5. An overload release clutch device comprising coaxial relatively rotatable members, one member having a clutch drum, a helical clutch spring yieldably anchored at one end to the other member and having a coil portion adapted for frictional driving engagement with the drum, an actuator for the spring slidably mounted for radial movement on said one member into and out of energizing engagement with said coil portion, yielding means normally holding the actuator in clutch energizing position, and torque releasing means connected with said other member and operating on the actuator in event of a predetermined amount of relative angular movement on part of said relatively rotatable members to move the actuator out of clutch energizing position.

6. An overload release clutch comprising a rotary drum member, a coaxial torque-transmitting member, a helical clutch element having a torsionally yieldable connection with said coaxial member and having clutching coils positioned for frictional engagement with the drum, a clutch controlling or actuating device on the drum having an energizing connection with one of the clutching coils, an overcenter spring normally holding the controlling device so that the clutching coils are energized into engagement with the drum, and releasing means on said coaxial member operable on the controlling device to strain the spring to its overcenter position retaining the clutch in released condition consequent upon occurrence of a predetermined degree of angular relative movement between the drum and said coaxial member due to straining of the torsionally yieldable connection.

7. An overload release clutch comprising a central shaft member having spaced circular enlargements thereon, a drum journalled for rotation on the enlargements, a helical clutch element having a torsionally flexible connection with the shaft member and having clutching coils for engagement with the drum, a spring energizer yoke slidably mounted on the drum for movement crosswise of its axis and having a projection at one side of the shaft member movable into and out of abutment relationship to a terminal clutching coil of the clutch element, said yoke having another projection diametrically opposite the first projection and on the opposite side of the yoke therefrom, a spring bearing on one of the projections to hold the yoke normally in clutch-energizing position, and a cam on the shaft member movable against one of the projections incident to relative angular movement of the drum and shaft member enabled by straining of the torsionally flexible connection to move the yoke out of energizing position against the force of the spring.

CARL P. PEPPER.

No references cited.